United States Patent Office 2,777,662
Patented Jan. 15, 1957

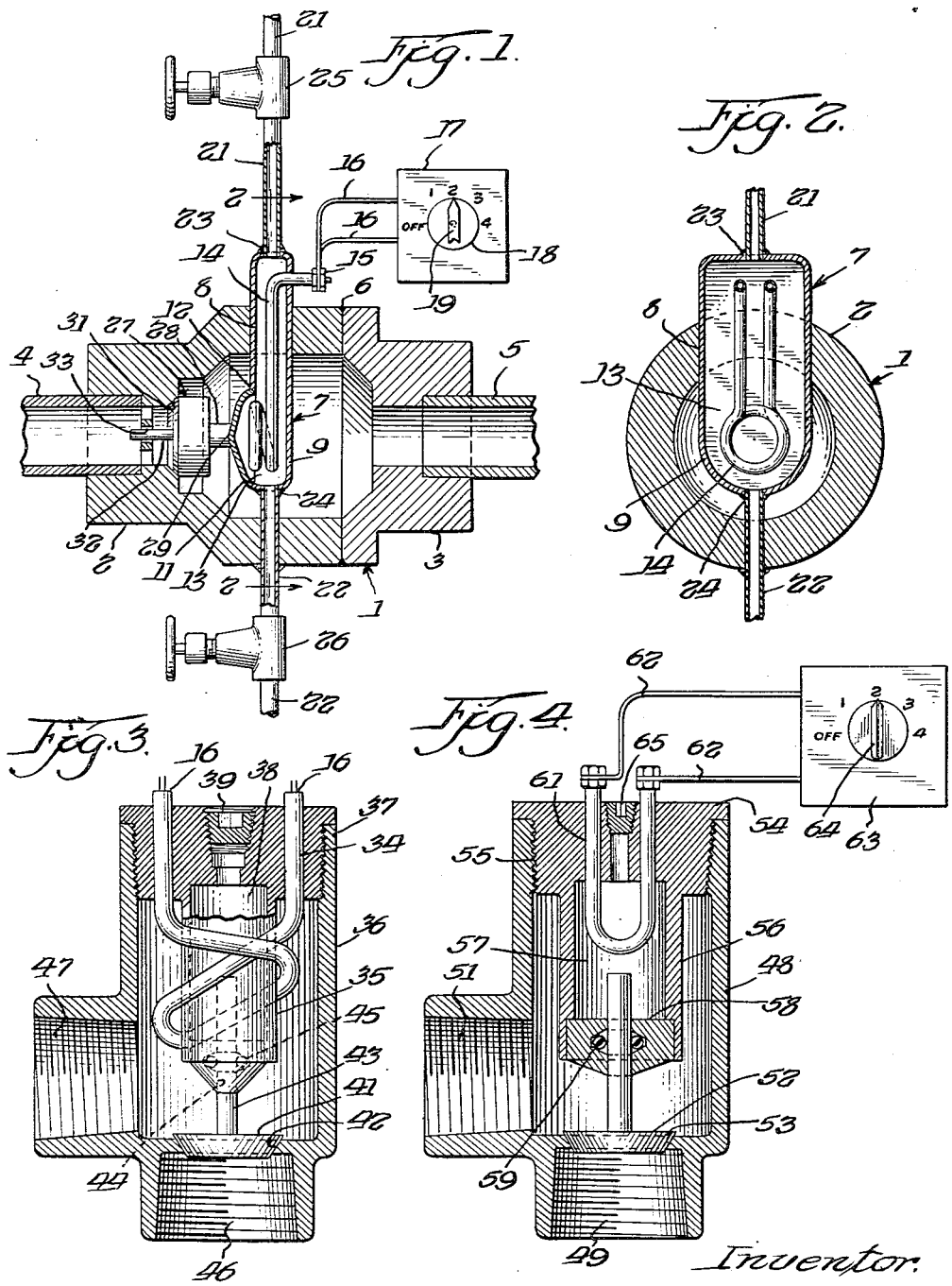

2,777,662

MULTI-HEAT MOTOR ACTUATED VALVES

George E. Hansen, Elmwood Park, Ill., assignor to Crane Co., Chicago, Ill., a corporation of Illinois Application August 17, 1951, Serial No. 242,381

4 Claims. (Cl. 251—11)

This invention relates to multi-heat motor actuated valves, and, more particularly, to a novel form of valve construction in which the closure member or disc is operable either by means of a bimetallic element or a suitable pressure actuated means cooperating with the said closure member.

In order to obtain a more complete understanding of the significance of this contribution, it should be understood that heretofore packless valves of this general type have been largely operated by means of solenoid mechanisms or other forms of remote control operating mechanisms. However, these devices have been subject to the objection that the solenoids, for example, have frequently not been sufficiently strong or powerful to develop the necessary torque or pull to effect the desired operation.

Another objection is that the previous types of structures have not possessed sufficient flexibility to enable them to be operated under conditions of relatively high pressures or temperatures, or a combination of both.

Thus, it is one of the more important objects of this invention to provide a means for obtaining valve operation whereby the valve may be either slowly or quickly opened or closed depending upon the nature of the circumstances.

Another object of the invention is to provide for a valve operating structure, in which such moving parts as the valve stems, packing glands, and stuffing boxes are eliminated and the cost of the valve is correspondingly reduced.

A further object is to provide for a structure in which a bimetallic disc actuator may be used which changes in shape with the temperature fluctuation and thus causes valve operation.

A further object is to provide for a structure in which the range of the operating temperature of the bimetallic unit can be controlled, for example, by means of a multi-positioned resistance switch. The bimetallic element or the pressure actuated element to which the disc or closure is fastened or applied integrally either to the heating element or housing. By merely changing or regulating the temperature within the said heating element or housing, the bimetallic disc or pressure responsive element will move the valve closure member thereby to open or close the valve.

It has been further found that by the employment of a suitable switch, the valve can be made to operate within a range of open, closed, or throttle positions.

A further object is to provide a structure in which the actuating heating element may be suitably connected to a water pipe line, so that if the valve requires opening within a quick interval, water or other fluid is allowed to enter the housing and thereby cool the bimetallic element or disc closure member employed.

A further object is to supply a substitute for the use of the water line by permitting in combination with the heating element a valve line or flow connection to steam or hot water supply so that operation of the bimetallic disc can be controlled accordingly.

Other objects and advantages will become more readily apparent upon proceeding with the following specification read in light of the accompanying drawings, in which Fig. 1 is a sectional assembly view of a valve embodying the actuating or motivating means of this invention.

Fig. 2 is a fragmentary sectional view taken on the line 2—2 of Fig. 1.

Fig. 3 is a sectional assembly view of a modified form of structure.

Fig. 4 is a fragmentary sectional view of a further modification.

Similar reference numerals refer to similar parts throughout the several figures.

Referring now to Fig. 1, a conventional globe valve casing, generally designated 1, is shown consisting of two coupled portions, 2 and 3 respectively, constituting the inlet and outlet of the valve and connected in any suitable manner to the inlet supply conduit 4 and the discharge pipe 5. The valve halves or sections may be joined in any one of several ways, for example, by means of the line weld, as indicated at 6, peripherally applied as shown, thereby to effect a fluid sealed relationship between the parts 2 and 3 of the casing 1 after assembly of the internal elements hereinafter described. The heating element, generally designated 7, is preferably, but not necessarily, positioned in transverse relationship within the valve in a fluid sealed connection at 8. The casing 9 is provided as at 11 with the bimetallic element 12 so designated which is welded, soldered, or otherwise connected to the casing, thus completing an internal chamber 13. Through the latter, a coiled heating rod 14 is extended, the latter rod being connected in the usual manner, as at 15, to the electric wires 16 connected in the usual manner to a power line by means of a multiple resistance switch 17.

The switch is provided in the customary manner with a resistance element generally designated 18, so that the desired amount of heat may be applied to the heating rod 14. By means of the selective application of the pointer 19, structure is provided useful in developing the desired heating resistance for the electrical element. Preferably, but not necessarily, opposite end portions of the casing may have the conduits 21 and 22 leading therefrom and connected as at 23 and 24 to the casing 9. Preferably, the valves 25 and 26 are provided for the control or regulation of the fluid admission into the inlet and outlet respective conduits 21 and 22 in the manner desired and for reasons hereinafter explained in greater length. The bimetallic element 11 has attached thereto or integral therewith a disc or closure member, generally designated 27, with an extension 28 either abutting or attached as at 29 to the bimetallic element 11. The closure member 27 has fluid sealing contact at 31 with the casing 1 to form the usual valve seat. Preferably at its lower end portion, a closure member has an extension rod or guide 32, receivable within the integral spider 33, as indicated, to guide the disc or closure member in the course of its reciprocal movement within the casing.

In the operation of this device, the switch 17 connected to an electric supply line allows the electric current to enter by means of the wires 16 into the heating rod 14, thereby causing the temperature of the latter to rise rapidly. Thus, the temperature within the chamber 13, which may be either supplied with a fluid or else by permitting the air within the chamber 13 to become heated, the bimetallic element is caused to expand and thereby force the closure member 27 toward the seat 31 of the casing. However, should such actuation be impossible, say, due to an electric line breakdown or because of other conditions, the benefit of the heating supplied by electricity cannot be received, then the conduit 21, controllable by means of the valve 25, may be connected to a suitable source of heat supplied, as, for example, with hot gases, steam, or the like. Thus, in a similar manner, the chamber 13 of the heating element is caused to become heated and similarly the expansion of the bimetallic element 11 is effected. A fine control of the temperature within the fluid of the chamber 13 may also be obtained by means of the regulation of the outlet valve, for example, at 26. Obviously, when it is desired to open the valve or to even throttle the valve, the desired fluid at a predetermined lower temperature may be used to cause the contraction of the bimetallic element 11, and thus lift the valve slightly or greatly, as required, from its seat within the casing.

It will, therefore, be clear that a relatively simple type of valve operator has been devised in which the danger of escape of fluids into atmosphere is avoided. At the same time, the closure member operation is positive and also is done with sufficient force to meet most conditions encountered in the field. While the shape of the heating rod 14 herein described is of coiled construction, it is, of course, clear that the shape of this rod may vary substantially, depending upon the nature of the services to be rendered and the shape of the heating chamber or casing 9.

Referring now to the modification shown in Fig. 3, it should be apparent that in some instances, it might be desirable to dispense with the internal chamber for containing the heating element. In this structure, the usual electric wires 16 are connected to a novel form of heating rod 34, which in the instant structure is mounted around the outside of the casing 35 attached to the valve body 36, as at 37, and in which case, the chamber portion 35 depends therefrom as shown. A chamber 38 to be heated is used, and, preferably, at the upper end thereof for the introduction of such fluids as may be desirable under certain conditions, a filler plug 39 is used. The heating element 34 is coiled around the depending portion 35, as shown. At the lower end of the chamber 38, a valve closure member 41 is used, seating within the casing as at 42, and having an upper stem portion 43 preferably integrally applied thereto, and projecting as indicated by the dotted lines within the chamber 38. Preferably, the journalled portion 44 of the depending section 35 may use the O-ring 45 as a sealing element. The valve casing is provided in the usual manner with the respective inlets 46 and 47, as shown, for suitable connection to pipe lines.

Here, it should be apparent that in the operation of this valve, when the electric current is applied at 16 to the heating element 34, the chamber 38 in the depending portion 35 will be heated, so as to create a fluid pressure condition within said chamber and thereby causing the disc or plunger closure member 41 to be forced downwardly toward the seat 42 and thus effect the desired seating contact therewithin. While an angle type of valve has been illustrated, it should, of course, be understood that this is merely for purpose of illustration, and the valve casing may be made in any other suitable form of valve structure, such as a gate or a globe, or even a lift check valve, if desired.

In the further modified structure shown in Fig. 4, the valve casing 48 is shown similarly provided with the inlets and outlets 49 and 51 and has the valve closure member 52 seating as at 53 within the casing 48. At the upper portion of the latter casing, a plug member 54 is used, threadedly attached as at 55, and is provided with a depending hollow extension 56 within which the chamber 57 is arranged. At the lower end portion thereof a guide support 58 is provided within which the closure member 52 is received and guided in leakproof relation by means of the annular sealing ring 59.

At the upper end of the chamber 57, a U-form of heating element 61 is mounted having the customary attachment of electric wires 62 connected in the same manner as described in connection with Fig. 1 to the multiple switch 63 having a resistance unit and the indicator 64 to supply the desired amount of heat to the heating rod 61. A filler plug for the same purpose as previously described is also installed as at 65. In this structure, it will be clear that the heating element 61 upon suitable electrical actuation will increase the temperature of the chamber 57 upon actuation of the switch 63, thereby causing the closure member under the rising pressure influence within the chamber 57 to be driven downward toward the valve seat 53 and thus making the seating contact shown. Similarly, a suitable conduit connection may be made in all instances, so that the heating element 61 may be conveniently replaced by piping connections supplying hot water or steam to the chamber 57 and thus operate the valve in the manner described in connection with Fig. 1.

While several embodiments of the invention have been shown and described, it will be obvious that within the spirit of the invention, a wide variety of actuating structure may be employed, and it is the desire, therefore, to be limited only by the scope of the appended claims.

I claim:

1. In a valve actuating mechanism, the combination comprising a valve casing, a chamber in the said casing and a valve seat in the chamber, means for supplying heated fluid to the said valve casing, the said fluid supply means comprising an inner casing within the chamber of said first named casing, a bimetallic element forming a wall of the said inner casing, a heating rod for affecting the temperature of the said inner casing, a closure member connected with the said bimetallic element and being responsive to changes in temperatures of fluid within the said inner casing effected by the said fluid heating means thereby to open and close the valve, and means cooperating with the said fluid supply means for regulating the input of the fluid means to the said inner casing.

2. In a valve actuating mechanism, the combination comprising a valve casing, a chamber in the said casing and a valve seat in the chamber, means for supplying heated fluid to the said casing, the said fluid supply means comprising an inner casing of flattened configuration within the chamber of said first named casing, a bimetallic element constituting a face portion of the said inner casing, a heating rod within the inner casing for changing the temperature of the said inner casing, a closure member connected to the said inner casing for reciprocating movement relative to said valve seat, and being connected to said bimetallic element for movement responsive to changes in temperatures of fluid within the said inner casing effected by the said fluid heating means thereby to open and close the valve, and means exterior of the said first named casing for regulating the input of the fluid means to the said inner casing, the said bimetallic element constituting a predeterminately movable transverse end wall of the said inner casing.

3. In a valve actuating mechanism, the combination comprising a valve casing, a chamber in the said casing and a valve seat in the chamber, means for supplying heated fluid to the said casing, the said fluid supply means comprising an inner casing within the chamber of said first named casing, a bi-metallic element forming a portion of one wall of said inner casing, a coiled heating rod for changing the temperature of the said inner casing, a closure member connected to the said bi-metallic element and being responsive to changes in temperatures of fluid within the said inner casing effected by the said fluid heating means thereby to open and close the valve seat, the coiled portion of said heating rod being positioned in close proximity back of said bi-metallic element, and valve means cooperating with the said fluid supply means for regulating the input of the fluid means to the said inner casing, the said valve means being carried by the said fluid supply means.

4. The subject matter of claim 1, the said casing having guide means cooperating with the said closure member to axially align the movement of said latter member relative to the said valve seat.

References Cited in the file of this patent

UNITED STATES PATENTS

| | | |
|---|---|---|
| 441,817 | Bell | Dec. 2, 1890 |
| 1,441,549 | Wells | Jan. 9, 1923 |
| 1,848,653 | Persons | Mar. 8, 1932 |
| 1,982,582 | Lovekin | Nov. 27, 1934 |
| 2,044,427 | Giesler | June 16, 1936 |
| 2,584,445 | Hajek | Feb. 5, 1952 |

FOREIGN PATENTS

| | | |
|---|---|---|
| 611,749 | Germany | Apr. 6, 1935 |